(12) United States Patent
Downs

(10) Patent No.: US 10,112,482 B2
(45) Date of Patent: Oct. 30, 2018

(54) POWER TRANSMITTING COMPONENT WITH FORK ACTUATOR

(71) Applicant: American Axle & Manufacturing, Inc., Detroit, MI (US)

(72) Inventor: James P. Downs, South Lyon, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 246 days.

(21) Appl. No.: 15/340,090

(22) Filed: Nov. 1, 2016

(65) Prior Publication Data

US 2017/0043663 A1    Feb. 16, 2017

Related U.S. Application Data

(63) Continuation of application No. 14/460,661, filed on Aug. 15, 2014, now Pat. No. 9,500,237.

(Continued)

(51) Int. Cl.

| | |
|---|---|
| *B60K 23/08* | (2006.01) |
| *F16H 63/30* | (2006.01) |
| *F16H 25/20* | (2006.01) |
| *B60K 17/35* | (2006.01) |
| *F16D 13/58* | (2006.01) |
| *F16H 1/00* | (2006.01) |
| *B60K 17/344* | (2006.01) |
| *F16D 23/12* | (2006.01) |

(Continued)

(52) U.S. Cl.
CPC ........ *B60K 23/0808* (2013.01); *B60K 17/344* (2013.01); *B60K 17/35* (2013.01); *F16D 13/58* (2013.01); *F16D 23/12* (2013.01); *F16H 1/00* (2013.01); *F16H 25/20* (2013.01); *F16H 25/2015* (2013.01); *F16H 63/304* (2013.01); *B60K 17/3467* (2013.01); *B60K 23/08* (2013.01); *B60K 25/06* (2013.01); *B60K 2023/0858* (2013.01); *B60Y 2400/3012* (2013.01); *B60Y 2400/405* (2013.01); *B60Y 2400/412* (2013.01); *B60Y 2400/82* (2013.01); *F16H 59/70* (2013.01); *F16H 2063/3063* (2013.01)

(58) Field of Classification Search
CPC .. B60K 23/0808; B60K 17/344; B60K 17/35; B60K 17/3467; B60K 23/08; B60K 25/06; B60K 2023/0858; F16H 25/2015; F16M 25/20; F16M 1/00; F16M 63/304; F16M 59/70; F16M 2063/3063; F16D 23/12; F16D 13/58; B60Y 2400/82; B60Y 2400/412; B60Y 2400/3012; B60Y 2400/405

See application file for complete search history.

(56) References Cited

U.S. PATENT DOCUMENTS

| | | |
|---|---|---|
| 4,853,629 A | 8/1989 | Rops |
| 5,743,143 A | 4/1998 | Carpenter et al. |

(Continued)

FOREIGN PATENT DOCUMENTS

| | | |
|---|---|---|
| CN | 101255903 A | 9/2008 |

*Primary Examiner* — Karen Beck

(74) *Attorney, Agent, or Firm* — Harness, Dickey & Pierce, P.L.C.

(57) ABSTRACT

A power transmitting component having a actuator with a lead screw, which is driven by a motor and a transmission, a pusher assembly driven by the lead screw, and a clutch fork. Translation of the pusher coordinates movement of the clutch fork along its axis.

10 Claims, 14 Drawing Sheets

Related U.S. Application Data

(60) Provisional application No. 61/869,312, filed on Aug. 23, 2013, provisional application No. 61/869,282, filed on Aug. 23, 2013, provisional application No. 61/869,295, filed on Aug. 23, 2013.

(51) Int. Cl.
*B60K 17/346* (2006.01)
*B60K 25/06* (2006.01)
*F16H 59/70* (2006.01)

(56) References Cited

U.S. PATENT DOCUMENTS

| | | |
|---|---|---|
| 5,867,092 A | 2/1999 | Vogt |
| 5,890,986 A | 4/1999 | Pritchard et al. |
| 6,230,577 B1 | 5/2001 | Showalter et al. |
| 6,382,040 B1 | 5/2002 | Diangelo et al. |
| 6,619,153 B2 | 9/2003 | Smith et al. |
| 8,156,837 B2 | 4/2012 | Smith |
| 8,258,779 B2 | 9/2012 | Wenzel et al. |
| 8,726,749 B2 | 5/2014 | Hirsch et al. |
| 2002/0125094 A1 | 9/2002 | Zimmermann et al. |
| 2008/0210034 A1 | 9/2008 | Murakami et al. |
| 2011/0152026 A1 | 6/2011 | Williams |

POWER TRANSMITTING COMPONENT WITH FORK ACTUATOR

CROSS-REFERENCE TO RELATED APPLICATIONS

This application is a continuation of U.S. application Ser. No. 14/460,661 filed Feb. 26, 2015, which claims the benefit of U.S. Provisional Application No. 61/869,282, U.S. Provisional Patent Application No. 61/869,295, and U.S. Provisional Patent Application No. 61/869,312, each of which having been filed on Aug. 23, 2013. The disclosures of the above applications are incorporated by reference as if set forth herein in their entirety.

FIELD

The present disclosure relates to a power transmitting component with a fork actuator.

BACKGROUND

This section provides background information related to the present disclosure which is not necessarily prior art.

Modern vehicle manufacturers have expressed increasing interest in four-wheel drive vehicle drivelines that are capable of operation in a two-wheel, high-speed drive mode as well as in a four-wheel, low-speed drive mode. Such drivelines typically include a variety of power transmitting components that may include clutches and/or transmissions that would need to be operated in two or more modes to provide the drivetrain with the desired functionality. Some of the known clutches and transmissions employed in such drivelines employ a pair of actuators (for controlling the operation of the clutch and the transmission), each of which utilizing a fork for axially sliding an element of the clutch or transmission. While such configurations work for their intended purpose, such power transmitting components are nevertheless susceptible to improvement.

SUMMARY

This section provides a general summary of the disclosure, and is not a comprehensive disclosure of its full scope or all of its features.

In one form, the present teachings provide a power transmitting component that includes an actuator housing, a motor coupled to the actuator housing, a transmission, a lead screw, a first rail, a second rail, a cradle assembly, a first fork and a second fork. The transmission is driven by the motor and at least partially housed in the actuator housing. The lead screw is rotatable about a first axis, the lead screw being driven by the transmission. The first rail extends along a second axis that is generally parallel to the first axis. The second rail extends along a third axis that is generally parallel to the first axis. The cradle assembly is driven by the lead screw axially along the first axis and includes a cradle having a first cradle yoke, which is slidably received on the first rail, and a second cradle yoke that is slidably received on the second rail. The first clutch fork is slidably mounted on the first rail. The second clutch fork is slidably mounted on the second rail. Movement of the cradle along the first rail coordinates movement of the first clutch fork along the second axis and movement of the second clutch fork along the third axis.

In another form, the present teachings provide a method for operating a power transmitting component having a first power transmitting member, a second power transmitting member and a collar. The first and second power transmitting members are rotatable along an axis. The collar is rotatably and slidably mounted to the first power transmitting member. The collar is axially movable along the axis between a fully disengaged position, in which the collar is disengaged from the second power transmitting member, and a fully engaged position. The method includes: providing an actuator with an electric motor and a clutch fork that is driven by the electric motor, the clutch fork being engaged to the collar; translating the collar to the fully disengaged position; generating a command to move the clutch fork to the engaged position and responsively operating the electric motor to cause the clutch fork to move the collar toward the fully engaged position; determining a position of the collar along the axis after the electric motor has halted operation; and limiting rotary power transmitted through the collar if the collar is not located in the fully engaged but is nevertheless engaged to the second power transmitting member to at least a predetermined extent.

In a further form, the present teachings provide a power transmitting component that includes a power take-off unit and an actuator. The power take-off unit has a mode clutch and a multi-speed transmission. The mode clutch has a mode member that is axially movable along a transmission axis between a first mode position, in which no rotary power is transmitted through the mode clutch, and a second mode position in which rotary power is transmitted through the mode clutch. The multi-speed transmission has a transmission member that is movable along the transmission axis between a first transmission position, in which the transmission operates in a first gear ratio, and a second transmission position in which the transmission operates in a second, different gear ratio. The actuator has an actuator housing, a motor coupled to the actuator housing, an actuator transmission, a lead screw, a first rail, a second rail, a cradle assembly, a first clutch fork, a second clutch fork, a first fork spring and a second fork spring. The actuator transmission is driven by the motor and is at least partially housed in the actuator housing. The lead screw is driven by the actuator transmission for rotation about a first axis. The first rail extends along a second axis that is generally parallel to the first axis. The second rail extends along a third axis that is generally parallel to the first axis. The cradle assembly includes a cradle, a cradle body, and a cradle spring. The cradle defines a first cradle yoke, which is slidably mounted on the first rail, a second cradle yoke, which is slidably mounted on the second rail, a first drive lug and a pair of arms. The cradle body is threadably coupled to the lead screw such that rotation of the lead screw causes corresponding axial movement of the cradle body along the first axis. The cradle spring is configured to center the cradle body between the arms of the cradle and to permit movement of the cradle body relative to the cradle along the first axis. The first clutch fork has a first clutch fork yoke, which is slidably mounted on the first rail, and a second drive lug. The first clutch fork is engaged to one of the mode member and the transmission member such that movement of the first clutch fork along the second axis causes corresponding movement of the one of the mode member and the transmission member along the transmission axis. The second clutch fork has a second clutch fork yoke, which is slidably mounted on the second rail, and a third drive lug. The second clutch fork is engaged to the other one of the mode member and the transmission member such that movement of the second clutch fork along the third axis causes corresponding movement of the other one of the mode member and the transmission member along the transmission axis. The first fork spring is received on the first rail and biasing the first clutch fork and the first cradle yoke apart from one another. The second fork spring is received on the second rail and biasing the second clutch fork and the second cradle yoke apart from one another. The first clutch fork is movable between a first fork position and a second fork position. The second clutch fork is movable between a third fork position and a fourth fork position. The first and second drive lugs contact one another over at least a portion of the travel of the first clutch fork when the first clutch fork is moved from the first fork position to the second fork position. The third drive lug contacts the actuator housing when the second clutch fork is in the fourth fork position.

In yet another form, the present teachings provide a power transmitting component that includes an actuator housing, a motor coupled to the actuator housing, a transmission, a lead screw, first and second rails, a cradle assembly and a clutch fork. The transmission is driven by the motor and is at least partially housed in the actuator housing. The lead screw is driven by the transmission about a first axis. The first rail extends along a second axis that is generally parallel to the first axis. The second rail extends along a third axis that is generally parallel to the first axis. The cradle assembly is driven by the lead screw axially along the first axis. The cradle assembly includes a cradle having a first cradle yoke, which is slidably received on the first rail, a cradle body and a cradle spring. The cradle body is received in the cradle and is threadably coupled to the lead screw. The cradle spring resiliently couples the cradle body to the cradle. The clutch fork is slidably mounted on the second rail. Movement of the cradle along the first rail coordinates movement of the clutch fork along the third axis.

In still another form, the present teachings provide a power transmitting component that includes a power take-off unit and an actuator. The power take-off unit has a mode clutch with a mode member that is axially movable along a power transmitting axis between a first mode position, in which no rotary power is transmitted through the mode clutch, and a second mode position in which rotary power is transmitted through the mode clutch. The actuator has an actuator housing, a motor coupled to the actuator housing, an actuator transmission, a lead screw, a first rail, a second rail, a cradle assembly, and a clutch fork. The actuator transmission is driven by the motor and is at least partially housed in the actuator housing. The lead screw is driven by the transmission about a first axis. The first rail extends along a second axis that is generally parallel to the first axis. The second rail extends along a third axis that is generally parallel to the first axis. The cradle assembly is driven by the lead screw axially along the first axis. The cradle assembly includes a cradle, a cradle body and a cradle spring. The cradle has a first cradle yoke that is slidably received on the first rail. The cradle body is received in the cradle and is threadably coupled to the lead screw. The cradle spring resiliently couples the cradle body to the cradle. The clutch fork is slidably mounted on the second rail. The clutch fork is engaged to the mode member such that movement of the clutch fork along the third axis causes corresponding movement of the mode member along the power transmitting axis. Movement of the cradle along the first rail coordinates movement of the clutch fork along the third axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
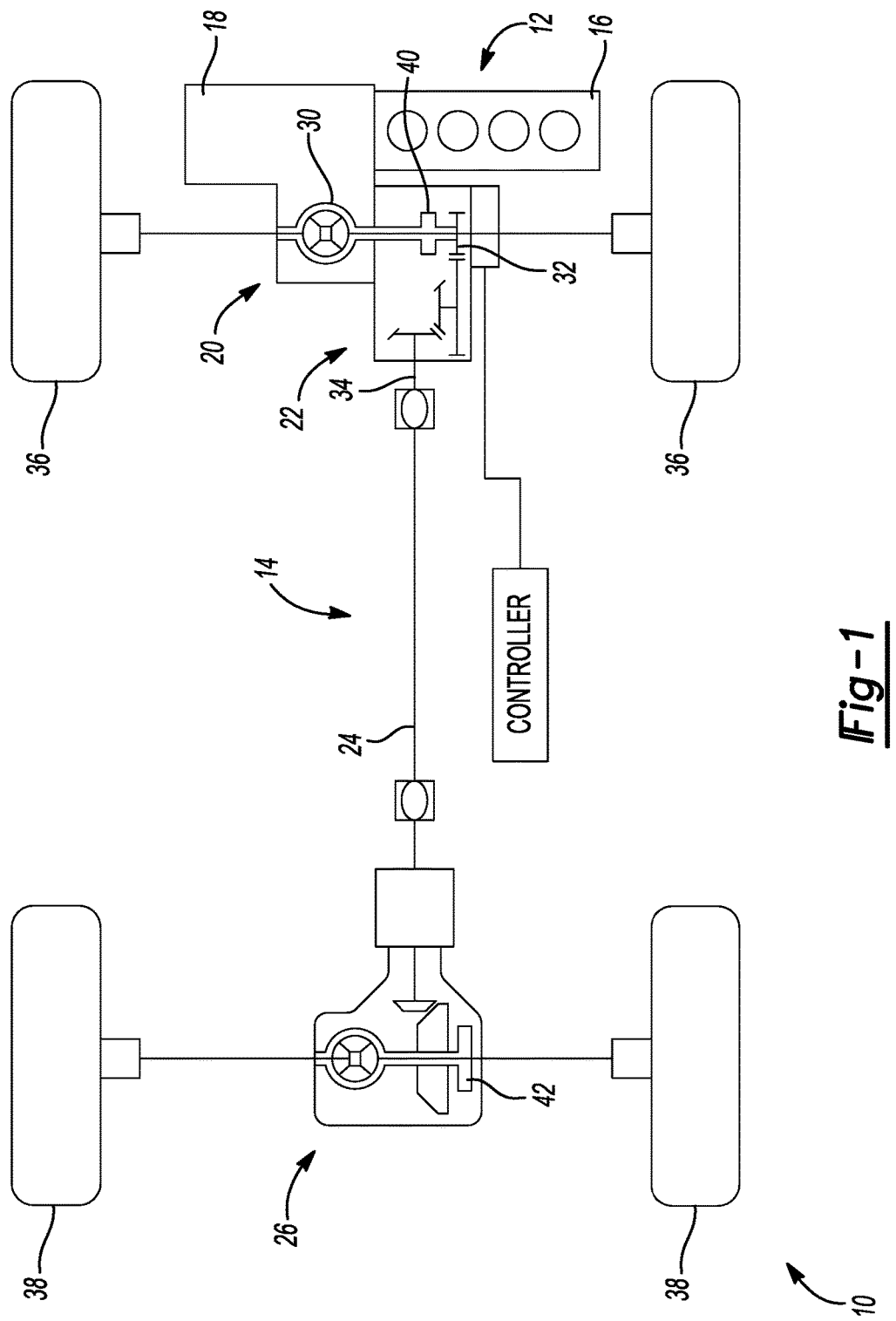
FIG. 1 is a schematic illustration of a vehicle having a power transmitting component with a twin-fork actuator constructed in accordance with the teachings of the present disclosure.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include the power transmitting component, which can include a front axle assembly 20 and a power take-off unit (PTU) 22, a prop shaft 24 and a rear axle assembly 26. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the drive train 14 could include one or more clutches to interrupt the transmission of rotary power through a part of the drive train 14. In the particular example provided, the drive train 14 include a mode or first clutch 40, which can be configured to interrupt the transmission of rotary power into or through the PTU 22, and a second clutch 42, which can be configured to halt rotation of components within the rear axle assembly 26.

Figure 2:
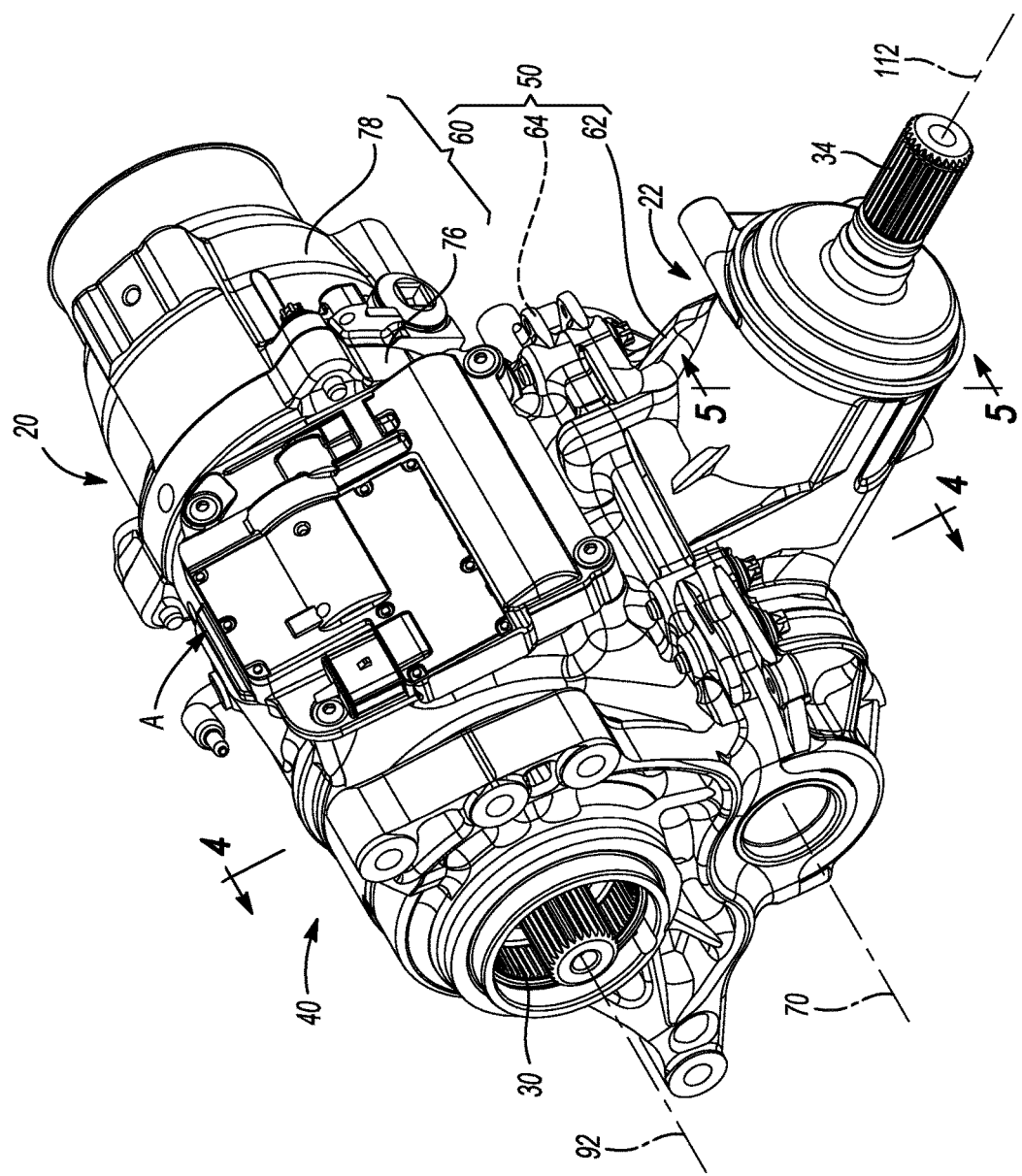
FIG. 2 is a perspective view of the power transmitting component of FIG. 1.
Figure 4:
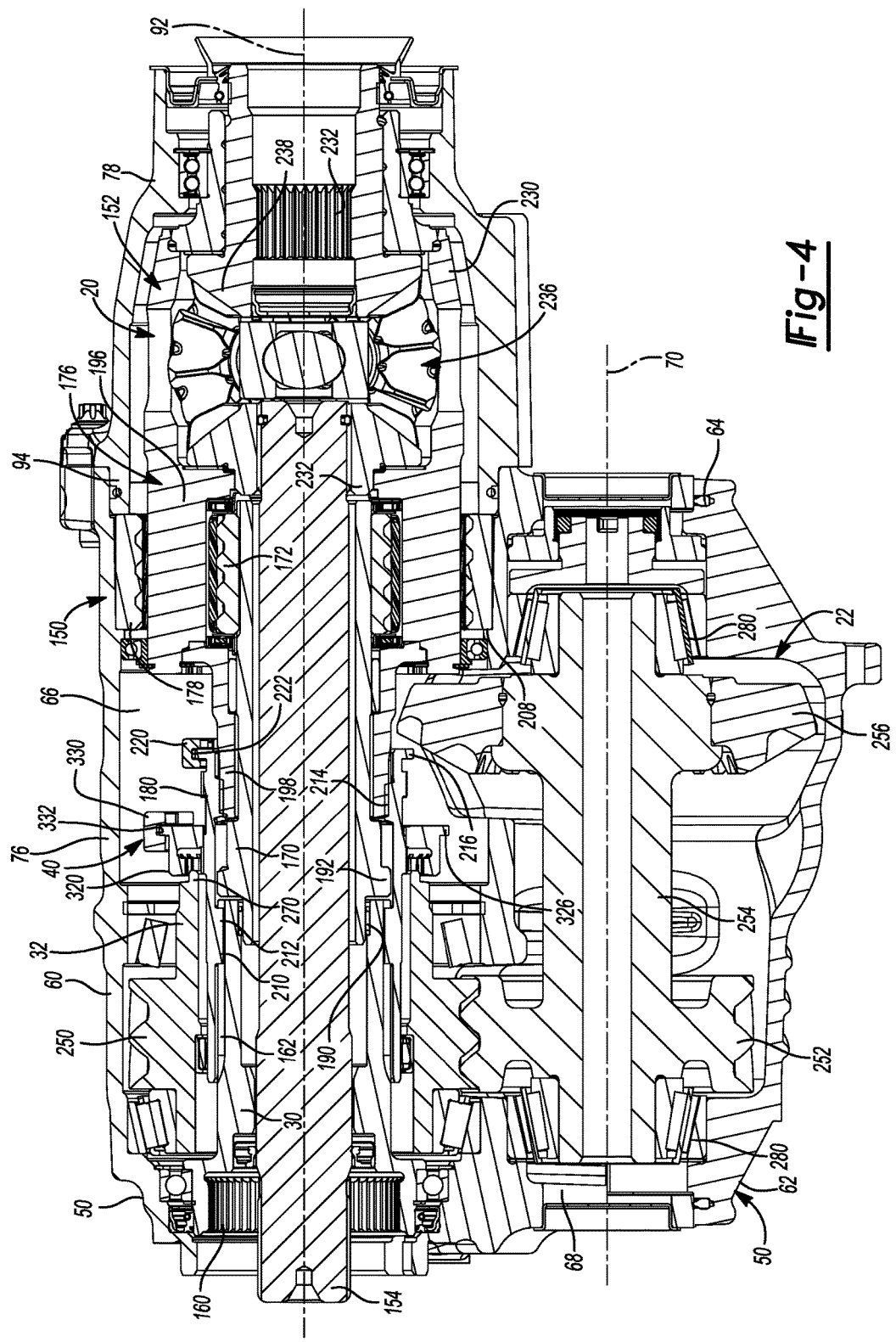
FIG. 4 is a section view taken along the line 4-4 of FIG. 2.

With reference to FIGS. 2 and 4, the front axle assembly 20, the PTU 22 and the mode clutch 40 are illustrated in more detail. The front axle assembly 20, the PTU 22 and the mode clutch 40 can be mounted in a housing assembly 50 and can be constructed in a manner that is described in co-pending U.S. patent application Ser. No. 13/470,941 filed May 14, 2012 and entitled "Disconnectable Driveline For All-Wheel Drive Vehicle". The housing assembly 50 can be constructed in a manner that is described in co-pending U.S. patent application Ser. No. 13/792,355 filed Mar. 11, 2013 and entitled "Power Transmitting Component With Multi-Part Housing Assembly Having Continuous Sealing Flange". The entire disclosures of U.S. patent application Ser. No. 13/470,941 and U.S. patent application Ser. No. 13/792,355 are incorporated by reference as if set forth in their entirety herein.

Figure 3:
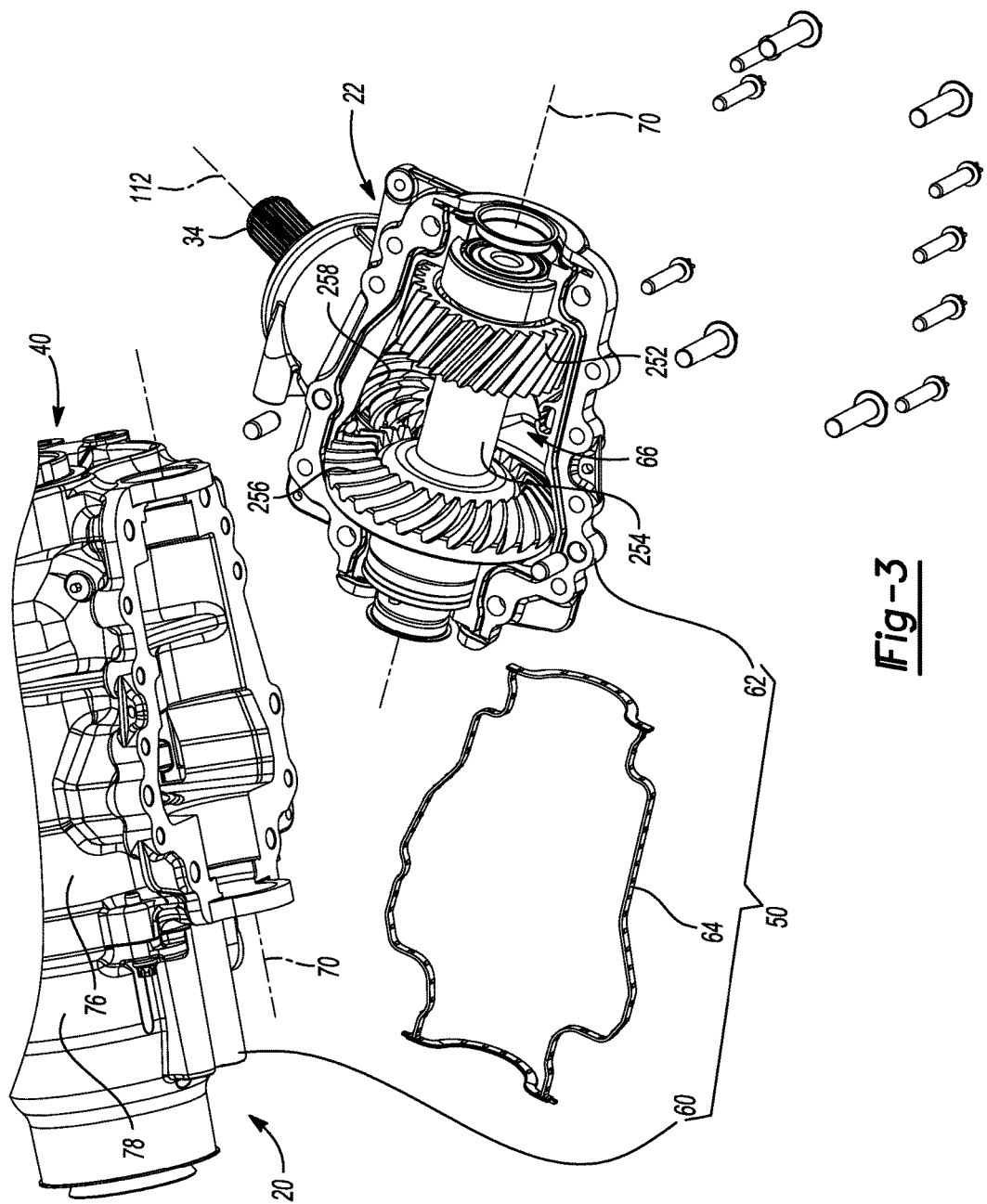
FIG. 3 is an exploded perspective view of a portion of the power transmitting component of FIG. 1.

With reference to FIGS. 2 and 3, the housing assembly 50 can include a first housing structure 60, a second housing structure 62 and a gasket 64 that can be received between the first and second housing structures 60 and 62. The first and second housing structures 60 and 62 can be fixedly but removably coupled to one another to define a cavity 66 and a shaft bore 68 (FIG. 4). The shaft bore 68 (FIG. 4) can be formed through the housing assembly 50 along a shaft axis 70 and can intersect the cavity 66. The first housing structure 60 can include a first housing member 76 and a second housing member 78 that can be fixedly but removably coupled to the first housing member 76. The first housing structure 60 can define an input member axis 92. The second housing structure 62 can define a pinion bore 110 (FIG. 5) that can be arranged about a pinion axis 112 that can be perpendicular to the shaft axis 70.

With reference to FIG. 4, the front axle assembly 20 can include the input member 30, a two-speed transmission 150, a front differential assembly 152 and a pair of front axle shafts 154 (only one is shown for clarity). The input member 30 can be a hollow shaft having a plurality of internal teeth or splines 160, which can be disposed on a first axial end of the input member 30 and configured to engage with the output member (not shown) of the transmission 18 (FIG. 1), and a set of first (external) range teeth 162 formed on a second, opposite end. The two-speed transmission 150 can include an input shaft 170, a sun gear 172, a plurality of planet gears (not specifically shown), a planet carrier 176, a ring gear 178 and a range collar 180. The input shaft 170 can be a hollow structure that can be co-axial with the input member 30. A needle bearing 190 can be disposed between the input shaft 170 and the input member 30. The input shaft 170 can have a set of second (external) range teeth 192 formed on an end adjacent to the input member 30. The sun gear 172 can be mounted on an end of the input shaft 170 opposite the second (external) range teeth 192 and can be coupled to the input shaft 170 for rotation therewith. The planet gears can be meshingly engaged with the sun gear 172 and the ring gear 178. The planet carrier 176 can include a carrier body 196 and a plurality of pins (not specifically shown) that can be fixedly coupled to the carrier body 196 for rotation therewith. The carrier body 196 can have a set of third (external) range teeth 198. The ring gear 178 can be meshingly engaged to the planet gears and can be non-rotatably coupled to the first housing member 76. A shoulder 94 on the second housing member 78 can clamp the ring gear 178 against a shoulder 208 in the first housing member 76 to inhibit axial movement of the ring gear 178 relative to the first housing structure 60.

The range collar 180 can be a tubular sleeve that can be mounted on the input shaft 170. The range collar 180 can include fourth, fifth and sixth sets of (internal) range teeth 210, 212 and 214, respectively, that can be axially separated from one another, and a collar member 216. The fourth set of (internal) range teeth 210 can be slidably engaged to the first set of (external) range teeth 162 on the input member 30 so that the range collar 180 is coupled to the input member 30 for rotation therewith. The collar member 216 of the range collar 180 can be engaged to an actuator A (FIG. 2) to permit the range collar 180 to be moved axially between first, second and third range positions. Any type of actuator (not specifically shown) can be employed, but in the example illustrated, the actuator comprises an axially movable range fork 220 having a groove into which the collar member 216 is received.

Figure 6:
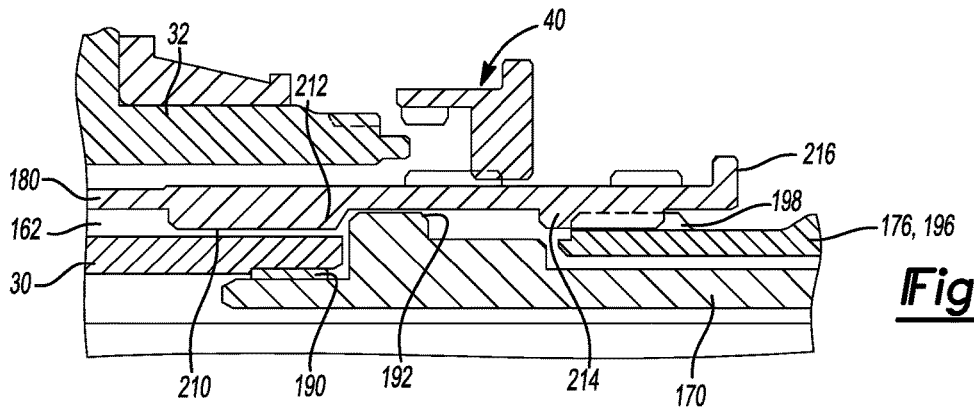
FIGS. 6-9 are enlarged section views of a the power transmitting component of FIG. 1 illustrating the range and mode collars in a high-range, two-wheel drive mode, a high-range, four-wheel drive mode, a neutral mode, and a low-range, four-wheel drive mode, respectively.
Figure 7:
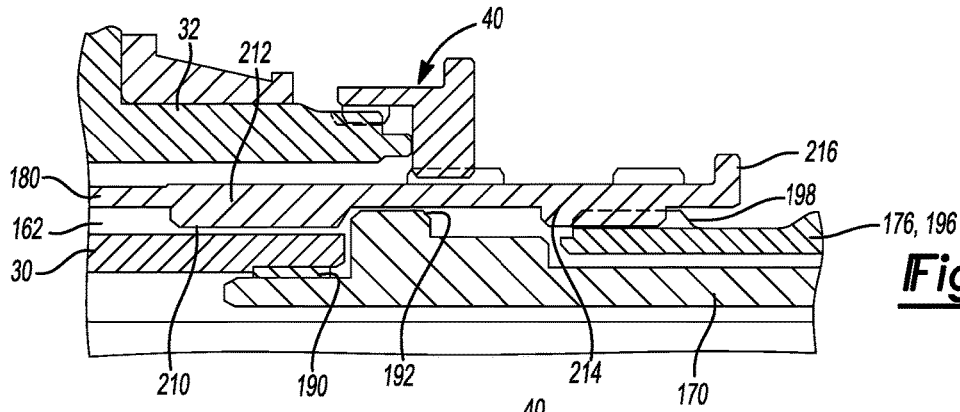

In the first range position, which is shown in FIGS. 6 and 7, the fifth set of (internal) range teeth 212 is decoupled from the second set of (external) range teeth 192 on the input shaft 170 and the sixth set of (internal) range teeth 214 is coupled to the set of third (external) range teeth 198 on the carrier body 196 to thereby provide a "high-speed condition" in which the two-speed transmission 150 (FIG. 4) operates in a first or high-speed gear reduction.

Figure 8:
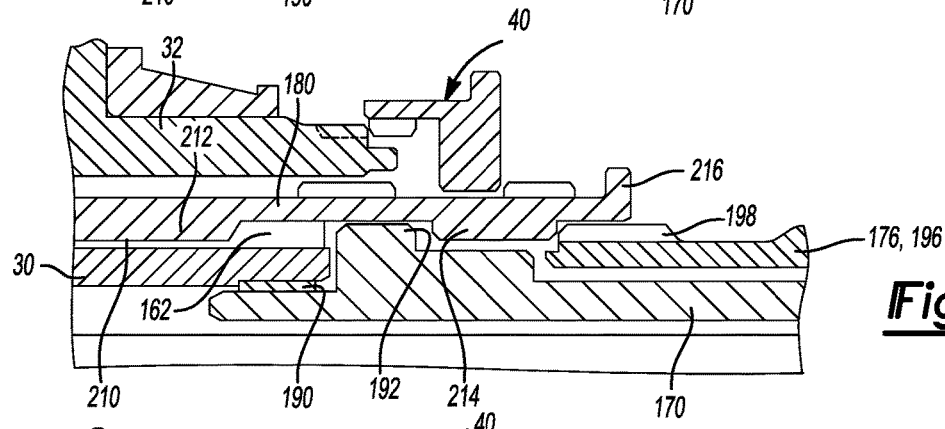

In the second range position, which is shown in FIG. 8, the fifth set of (internal) range teeth 212 is decoupled from the second set of (external) range teeth 192 on the input shaft 170 and the sixth set of (internal) range teeth 214 is decoupled from the set of third (external) range teeth 198 on the carrier body 196 to thereby provide a "neutral condition" in which rotary power is not transmitted through the two-speed transmission 150 (FIG. 4), the front differential assembly 152 (FIG. 4) or the PTU 22 (FIG. 4).

Figure 9:
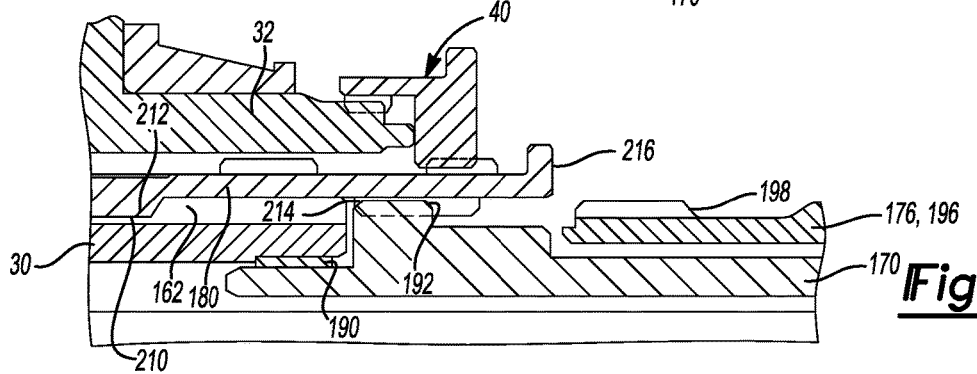

In the third range position, which is illustrated in FIG. 9, the sixth set of (internal) range teeth 214 is coupled to the second set of (external) range teeth 192 on the input shaft 170 and the sixth set of (internal) range teeth 214 is decoupled from the set of third (external) range teeth 198 on the carrier body 196 to thereby provide a "low-speed condition" in which the two-speed transmission 150 (FIG. 4) operates in a second or low-speed gear reduction.

Returning to FIG. 4, the front differential assembly 152 can include a differential case 230, a pair of output members 232 and a means for permitting speed differentiation between the output members 232. The differential case 230 can be coupled to the carrier body 196 for rotation therewith such that the differential case 230 is rotatable about the input member axis 92. The differential case 230 can house the output members 232 and the speed differentiation means. In the example provided, the speed differentiation means comprises an open differential gearset 236 that has a pair of side gears 238 and the output members 232 can comprise portions (e.g., an internally-splined bore) of the side gears 238 to which the front axle shafts 154 are non-rotatably coupled. It will be appreciated, however that other speed differentiation means could be employed in the alternative, such as one or more clutches, a locking differential or a limited slip differential. Moreover, while the differential gearset 236 is illustrated as having bevel pinions and sidegears, it will be appreciated that the pinions and sidegears could have a parallel-axis configuration in which the pinions and side gears have spur or helical gear teeth.

The front axle shafts 154 can have a male-splined segment that can be non-rotatably coupled to the output members 232 such that the front axle shafts 154 are rotatably driven by the output members 232. One of the front axle shafts 154 can be received through the input shaft 170 and the input member 30.

Figure 5:
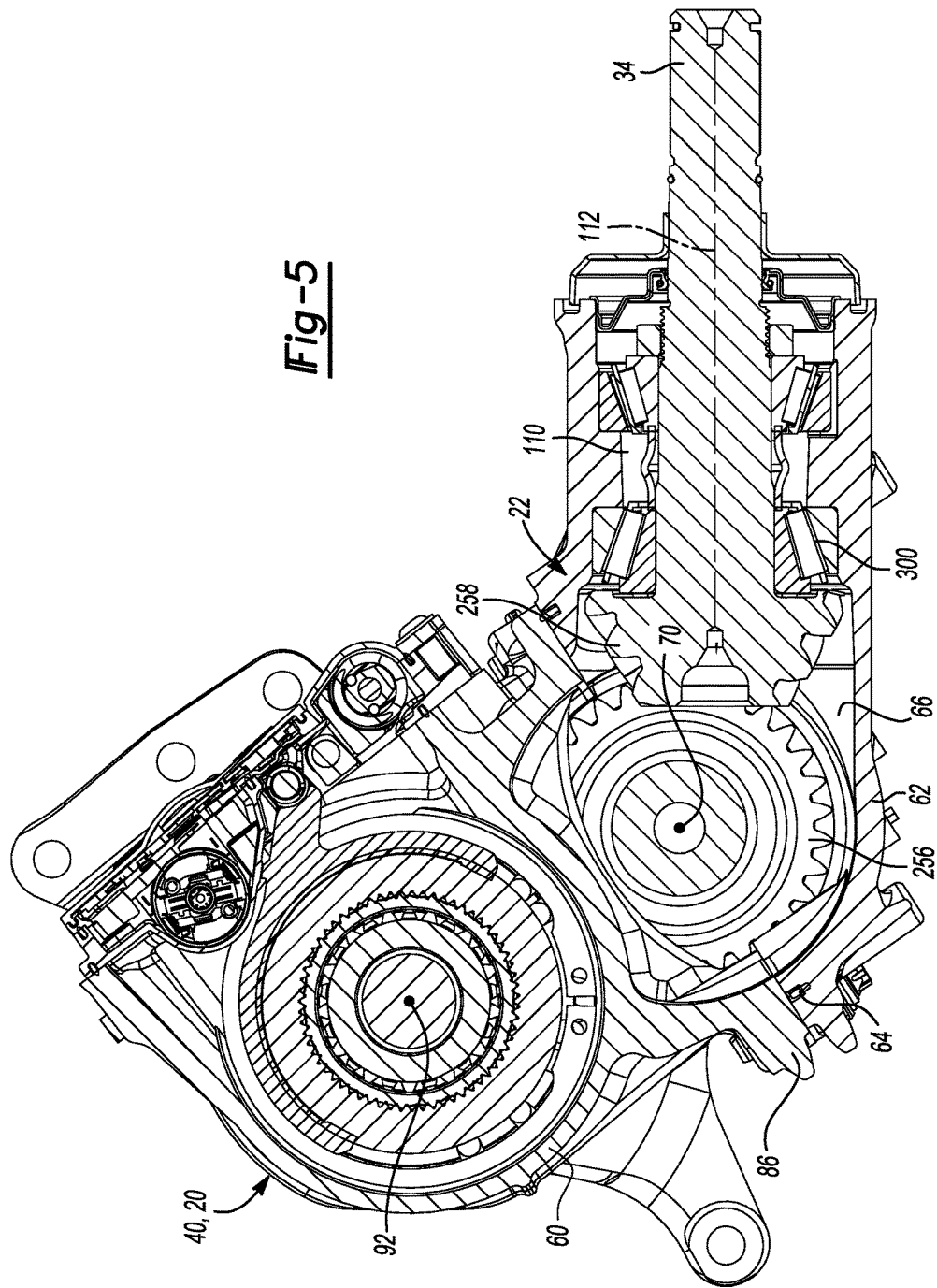
FIG. 5 is a section view taken along the line 5-5 of FIG. 2.

With reference to FIGS. 4 and 5, the PTU 22 can include the PTU input member 32, a first intermediate gear 250, a second intermediate gear 252, a shaft 254, a ring gear 256, a pinion gear 258 and the PTU output member 34. The PTU input member 32 can comprise a plurality of first (external) mode teeth 270 that can be fixedly coupled to the first intermediate gear 250. The PTU input member 32 and the first intermediate gear 250 can be mounted in the first housing member 76 concentrically about the input member 30. The second intermediate gear 252 can be meshingly engaged to the first intermediate gear 250. The shaft 254 can be coupled to the second intermediate gear 252 for rotation therewith. A pair of shaft bearings 280 can support the shaft 254 for rotation relative to the housing assembly 50. The ring gear 256 can be mounted on the shaft 254 on an end opposite the second intermediate gear 252. The pinion gear 258 can be received in the pinion bore 110 in the second housing structure 62 and can be supported for rotation relative to the second housing structure 62 by a set of pinion bearings 300. The pinion gear 258 can be meshingly engaged to the ring gear 256. A bearing adjuster (not specifically shown) can be employed between the second housing structure 62 and one of the shaft bearings 280 to preload the shaft bearings 280 and/or to control the manner in which the teeth of the ring gear 256 are meshed with the teeth of the pinion gear 258. The bearing adjuster can be constructed in a conventional manner and as such, need not be described in significant detail herein. The PTU output member 34 can be coupled to the pinion gear 258 for rotation therewith.

The mode clutch 40 can be a dog clutch that can be configured to selectively couple the PTU input member 32 to the input member 30. The mode clutch 40 can have a clutch or mode collar 320 that can be received concentrically about the input shaft 170. With additional reference to FIG. 6, the mode collar 320 can have a second (internal) set of mode teeth 322, a third (internal) set of mode teeth 324, and an annular collar member 326. The collar member 326 can be engaged to an actuator, such as the actuator A (FIG. 2), to permit the mode collar 320 to be moved axially along the input member axis 92 between a first mode position and a second mode position. Any type of actuator can be employed, but in the example provide, the actuator A (FIG. 2) comprises an axially movable mode fork 330 having a groove 332 into which the collar member 326 is received.

In the first mode position, which is illustrated in FIG. 6, the mode collar 320 is axially separated from the PTU input member 32 such that the second (internal) set of mode teeth 322 are decoupled from the first (external) set of mode teeth 270 on the PTU input member 32. In the particular example shown, the third (internal) set of mode teeth 324 are engaged to a fourth (external) set of mode teeth 340 formed on the range collar 180 and as such, the mode collar 320 will rotate with the range collar 180 but no rotary power will be transmitted to the PTU input member 32. Consequently, the drive train 14 (FIG. 1) will operate in a 2-wheel, high-speed mode.

In the second mode position, which is illustrated in FIGS. 7 through 9, the mode collar 320 is engaged to the PTU input member 32 such that the second (internal) set of mode teeth 322 are coupled to the first (external) set of mode teeth 270 on the PTU input member 32.

In the example of FIG. 7, the third (internal) set of mode teeth 324 are engaged to the fourth (external) set of mode teeth 340 formed on the range collar 180 and as such the drive train 14 (FIG. 1) can be operated in a 4-wheel, high-speed mode. In the example of FIG. 8, the third (internal) set of mode teeth 324 are decoupled from the fourth (external) set of mode teeth 340 formed on the range collar 180 and a fifth (external) set of mode teeth 342 formed on the range collar 180 and as such the drive train 14 (FIG. 1) can be maintained in a neutral, non-driving condition. In the example of FIG. 9, the third (internal) set of mode teeth 324 are decoupled from the fourth (external) set of mode teeth 340 formed on the range collar 180 and coupled to the fifth (external) set of mode teeth 342 formed on the range collar 180 and as such the drive train 14 (FIG. 1) can be operate in a 4-wheel, low-speed mode.

Figure 10:
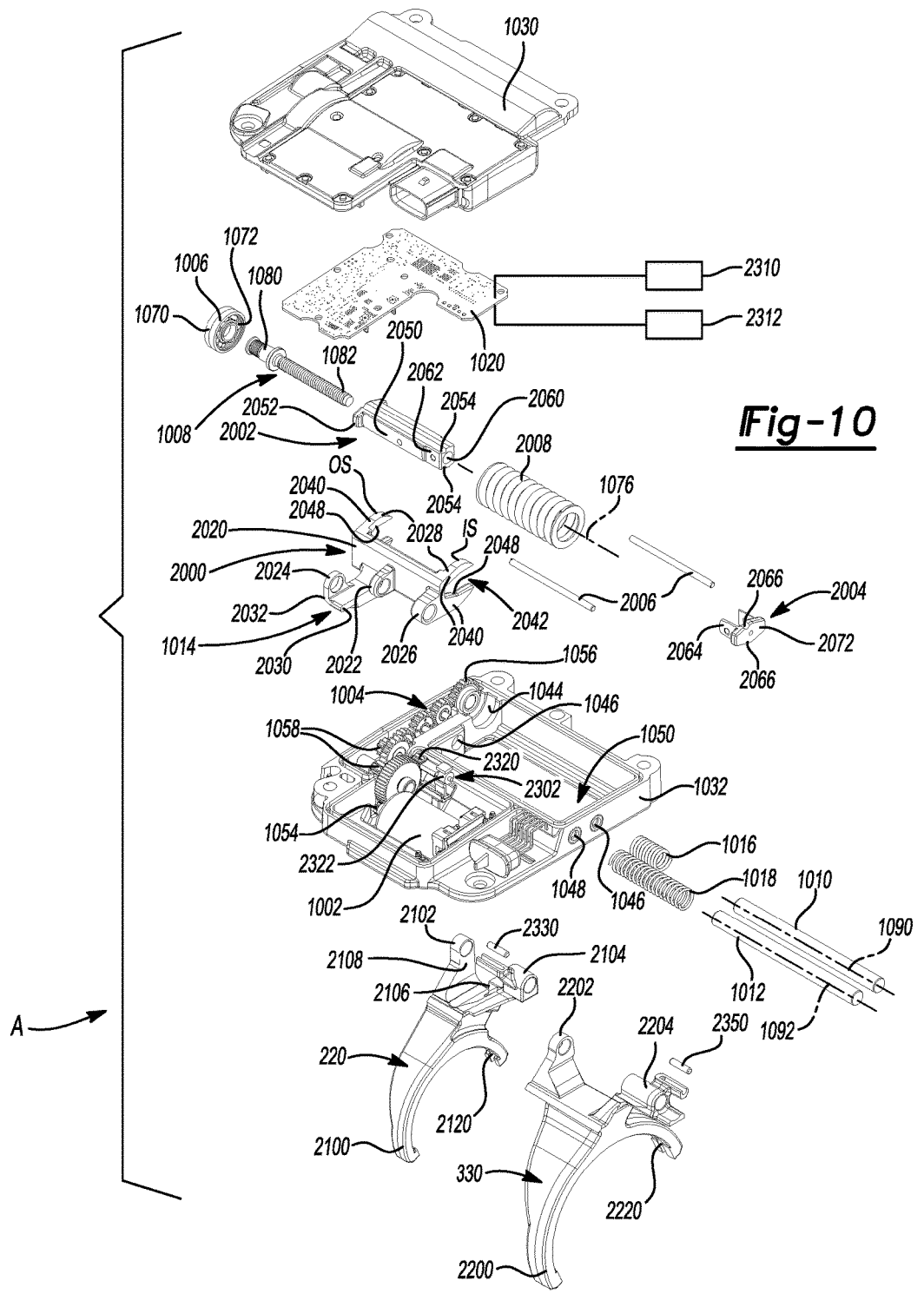
FIG. 10 is an exploded perspective view of the twin-fork actuator.

With reference to FIG. 10, the actuator A can include an actuator housing 1000, a motor 1002, a transmission 1004, a bearing 1006, a lead screw 1008, a first rail 1010, a second rail 1012, a cradle assembly 1014, the range fork 220, the mode fork 330, a first arm spring 1016, a second arm spring 1018, and a control system 1020.

The actuator housing 1000 can include a first cover member 1030 and a second cover member 1032 that can be sealingly coupled to the first over member 1030 by any suitable means, such as a gasket or a sealing compound. With additional reference to FIG. 11, the first cover member 1030 can define a motor mount 1036, a transmission mount 1038 and a first bearing mount 1040. The motor 1002 can be fixedly coupled to the motor mount 1036. The transmission mount 1038 can comprise two or more wall members 1042 that can support elements of the transmission 1004. The first bearing mount 1040 can be configured to receive a portion of the bearing 1006.

Figure 12:
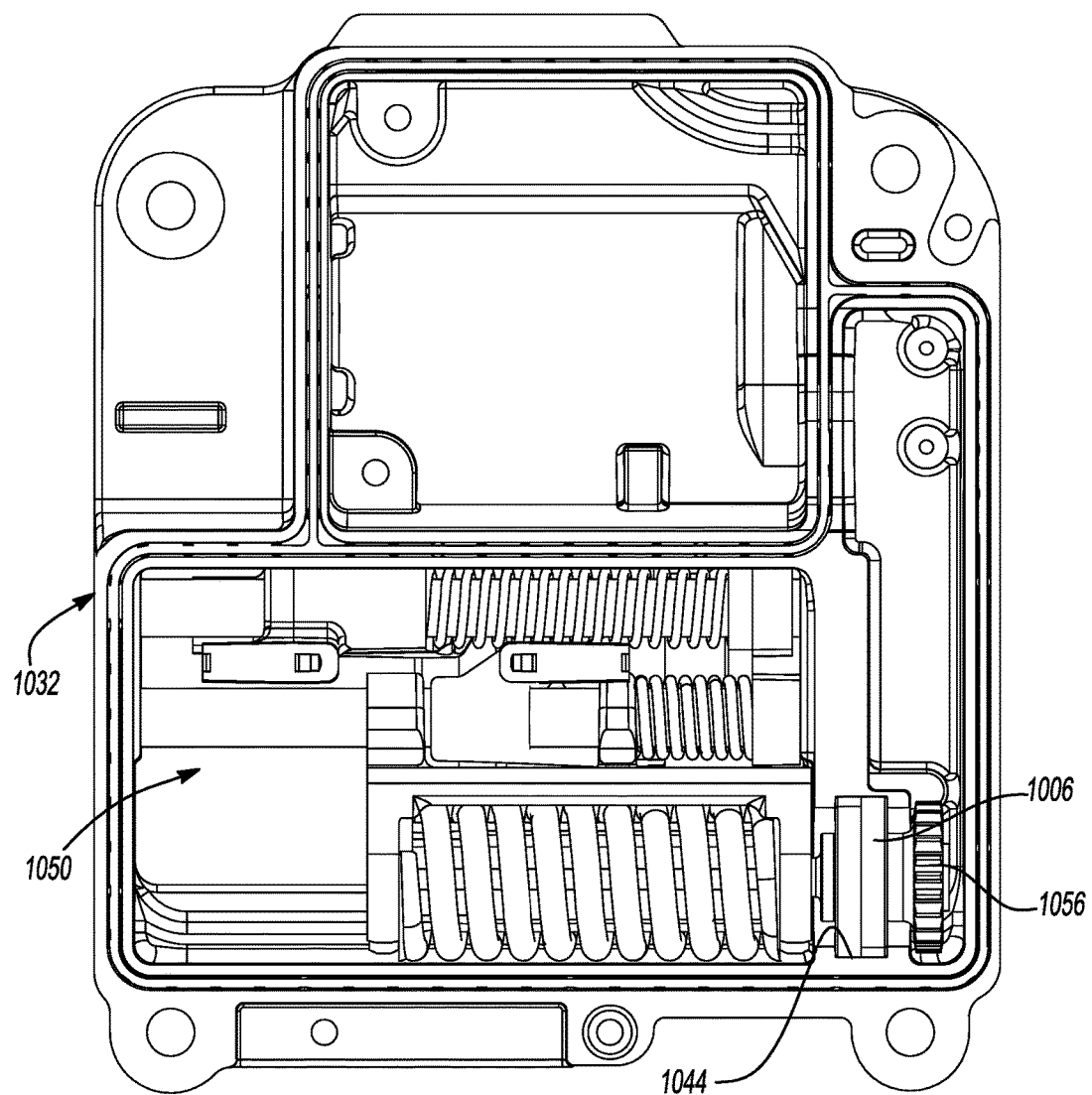
FIG. 12 is a top view of the twin-fork actuator with a top portion of the actuator housing removed.

With reference to FIGS. 10 and 12, the second cover member 1032 can be coupled to the first cover member 1030 to cover the motor 1002 and the transmission 1004. The second cover member 1032 can define a second bearing mount 1044, a pair of first rail apertures 1046, a pair of second rail apertures 1048 and a fork window 1050 through which the range fork 220 and the mode fork 330 can extend. The second bearing mount 1044 can cooperate with the first bearing mount 1040 to retain the bearing 1006 therebetween.

Figure 11:
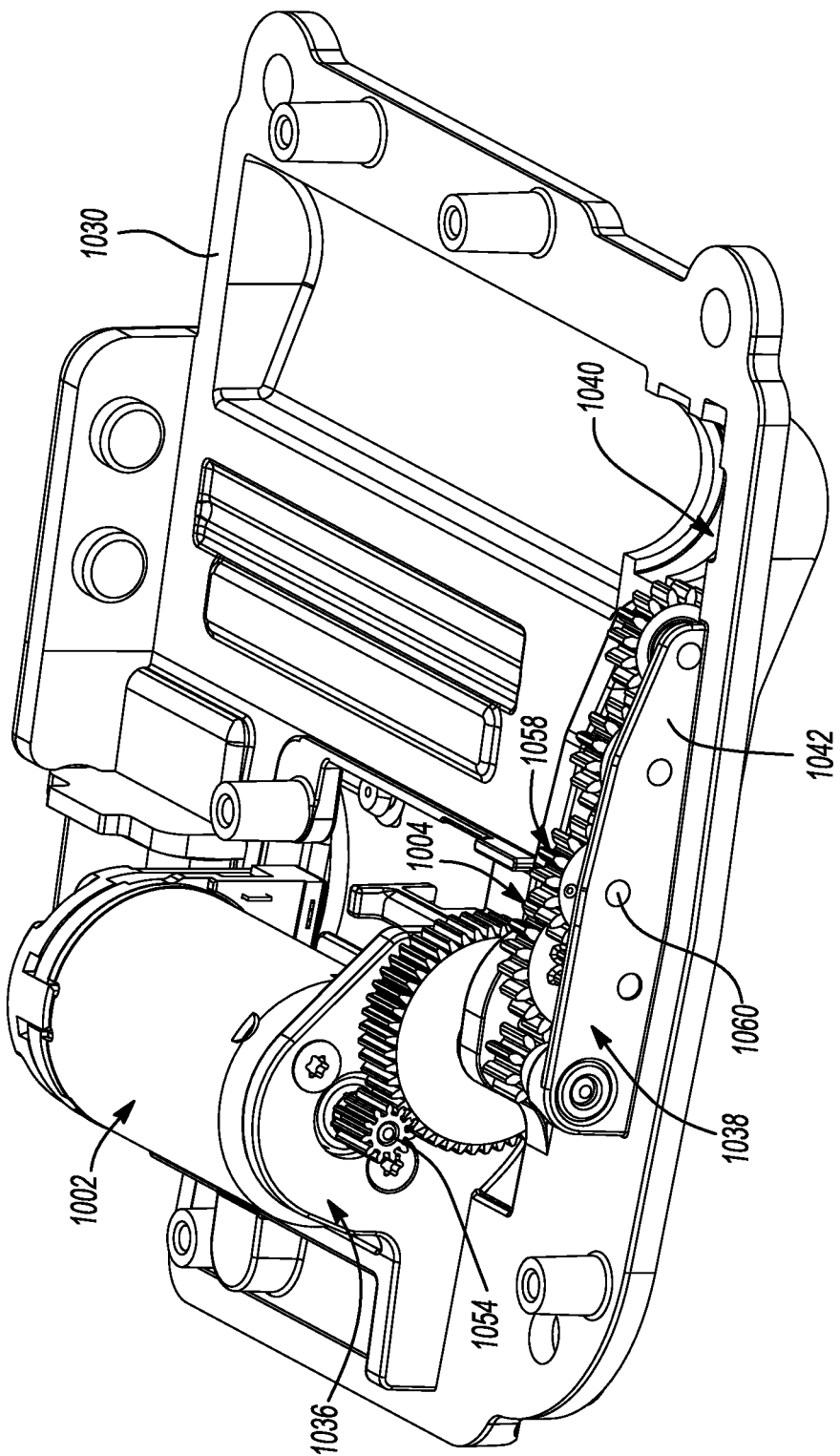
FIG. 11 is a perspective of a portion of the twin-fork actuator illustrating the motor, transmission and a portion of the actuator housing in more detail.

With renewed reference to FIGS. 10 and 11, the motor 1002 can be any means for providing rotary power, such as a brushed or brushless DC motor. The transmission 1004 can comprise any means for transmitting rotary power between the motor 1002 and the lead screw 1008, such as two or more pulleys, two or more sprockets and/or two or more gears. For example, the transmission 1004 can comprise an input spur pinion 1054, which can be mounted to the output shaft of the motor 1002 for rotation therewith, an output spur pinion 1056, which can be coupled to the lead screw 1008 for common rotation, and a plurality of intermediate spur gears 1058 that can transmit rotary power between the input spur pinion 1054 and the output spur pinion 1056. The intermediate spur gears 1058 can be mounted on axles 1060 that can be fixedly coupled to associated pairs of the wall members 1042. The transmission 1004 can provide a desired overall reduction ratio, such as an overall reduction ratio of about 250:1 to about 750:1 and preferably a reduction ratio of about 475:1.

The bearing 1006 can be a ball bearing having an outer bearing race 1070, which can be received in the first and second bearing mounts 1040 and 1044 to fixedly couple the outer bearing race 1070 to the actuator housing 1000, an inner bearing race 1072, which can support the lead screw 1008 for rotation about a first axis 1076, and a plurality of bearing elements (not specifically shown) between the outer and inner bearing races 1070 and 1072.

The lead screw 1008 can be unitarily and integrally formed and can comprise hub 1080 and a threaded portion 1082. The hub 1080 can be received in the inner bearing race 1072 and can be coupled to the output spur pinion 1056 of the transmission 1004 for rotation therewith.

The first rail 1010 can be received in the first rail apertures 1046 and fixedly coupled to the second cover member 1032 in any desired manner, such as a press-fit. The first rail 1010 can extend along a second axis 1090 that can be generally parallel to the first axis 1076. Similarly, the second rail 1012 can be received in the second rail apertures 1048 and fixedly coupled to the second cover member 1032 in any desired manner, such as a press-fit. The second rail 1012 can extend along a third axis 1092 that can be generally parallel to the first axis 1076.

The cradle assembly 1014 can comprise a cradle 2000, a cradle body 2002, a keeper 2004, one or more guides 2006 and a cradle spring 2008. The cradle 2000 can comprise a central body 2020, a first cradle yoke 2022, a second cradle yoke 2024, a third cradle yoke 2026, a pair of arms 2028, which can be coupled to opposite ends of the central body 2020, a first cradle drive lug 2030 and a second cradle drive lug 2032. Each of the first, second and third cradle yokes 2022, 2024 and 2026 can be coupled to the central body 2020. The first and third cradle yokes 2022 and 2026 can be slidably received on the first rail 1010, and the second cradle yoke 2024 can be slidably received on the second rail 1012. In the particular example provided, the first cradle yoke 2022 is located between the second and third cradle yokes 2024 and 2026. Each of the arms 2028 can be bifurcated to define a pair of branches 2040 with an arm aperture 2042 therebetween. Additionally, each of the arms 2028 can define a pair of first guide slots 2048 that can be partly formed through the arms 2028. More specifically, each of the first guide slots 2048 can extend through an inboard side IS of an associated one of the arms 2028 but not an outboard side OS of the associated one of the arms 2028. The first and second cradle drive lugs 2030 and 2032 can be disposed on the cradle 2000 at a location between the first cradle yoke 2022 and the second cradle yoke 2024. In the particular example provided, the first and second cradle drive lugs 2030 and 2032 form the opposite faces of a single structure.

The cradle body 2002 can comprise a longitudinally extending body member 2050 and a head 2052 and can define a pair of second guide slots 2054. The body member 2050 can have a threaded internal bore 2060 and a pair of flanks 2062. The threaded internal bore 2060 can receive the threaded portion 1082 of the lead screw 1008 to threadably couple the cradle body 2002 to the lead screw 1008. The head 2052 can be coupled to the body member 2050 on an end opposite the flanks 2062 and can extend radially outwardly therefrom. The head 2052 can be received in the arm aperture 2042 of a corresponding one of the arms 2028 and can be sized to non-rotatably but axially slidably engage the branches 2040 of the corresponding one of the arms 2028. The second guide slots 2054 can be longitudinally extending grooves formed in the body member 2050 and the head 2052 that are sized to partly receive the guides 2006.

The keeper 2004 can include a keeper head 2072 that can be received in the arm aperture 2042 of a corresponding one of the arms 2028 (opposite the arm 2028 that receives the head 2052 of the body member 2050) and can be sized to non-rotatably but axially slidably engage the branches 2040 of the corresponding one of the arms 2028. The keeper head 2072 can extend radially outwardly from the body member 2050 of the cradle body 2002. The keeper 2004 can be fixedly and non-rotatably coupled to the cradle body 2002 in any desired manner. In the particular example provided, the keeper 2004 includes a pair of keeper flanges 2064 that abut the flanks 2062 on the body member 2050 and a fastener, such as a pin (not specifically shown), is inserted through the keeper flanges 2064 and the flanges 2062 to couple the keeper 2004 to the cradle body 2002. A pair of third guide slots 2066 can be formed in the keeper head 2072. The third guide slots 2066 can be disposed in-line with the second guide slots 2054 in the cradle body 2002 when the keeper 2004 and the cradle body 2002 are assembled together. Those of skill in the art will appreciate that while the keeper 2004 and the cradle body 2002 have been described as being two discrete components that are assembled to one another, the keeper 2004 and the cradle body 2002 could be integrally and unitarily formed in the alternative.

The guides 2006 are configured to guide the keeper 2004 and the cradle body 2002 as they move along the first axis 1076 relative to the cradle 2000. In the example provided, two guides 2006 are provided and each guide 2006 is a steel rod that is received into a corresponding set of the first, second and third guide slots 2048, 2054 and 2066. It will be appreciated that as the first guide slots 2048 do not extend completely through the branches 2040 of the arms 2028, the guides 2006 are trapped between the arms 2028 while the cradle body 2002 and the keeper 2004 can slide on the guides 2006 so as to be capable of telescoping out of either end of the cradle 2000.

The cradle spring 2008 can be mounted co-axially about the central body 2020 of the cradle body 2002 and can abut an inside surface of the head 2052 of the cradle body 2002 and an inside surface of the keeper head 2072 of the keeper 2004. The cradle spring 2008 can center the cradle body 2002 and the keeper 2004 relative to the arms 2028 of the cradle 2000. Additionally, the cradle spring 2008 can permit axial movement of the cradle body 2002 along the first axis 1076 relative to the cradle 2000 as will be described in more detail, below.

The range fork 220 can include a first fork member 2100, a first fork yoke 2102, a second fork yoke 2104, a first fork drive lug 2106 and a second fork drive lug 2108. The first fork member 2100 can comprise a semi-circular structure having a groove 2120 into which the collar member 216 (FIG. 4) is received. The first and second fork yokes 2102 and 2104 can be slidably engaged to the first rail 1010 and can be fixedly coupled to the first fork member 2100. In the particular example provided, the first and third cradle yokes 2022 and 2026 are disposed axially between the first and second fork yokes 2102 and 2104. The first fork drive lug 2106 can be coupled to the second fork yoke 2104 and can be positioned in-line with the first cradle drive lug 2030 such that the first cradle drive lug 2030 can contact the first fork drive lug 2106 in some situations to coordinate movement of the range fork 220. The second fork drive lug 2108 can be coupled to the first fork yoke 2102 and can be positioned in-line with the second cradle drive lug 2032 such that the second cradle drive lug 2032 can contact the second fork drive lug 2108 in some situations to coordinate movement of the range fork 220.

The mode fork 330 can include a second fork member 2200, a third fork yoke 2202, and a fourth fork yoke 2204. The second fork member 2200 can comprise a semi-circular structure having a groove 2220 into which the collar member 326 (FIG. 4) is received. The third and fourth fork yokes 2202 and 2204 can be slidably engaged to the second rail 1012 and can be fixedly coupled to the second fork member 2200. In the particular example provided, the second cradle yoke 2024 is disposed axially between the third and fourth fork yokes 2202 and 2204.

The first arm spring 1016 can be a compression spring that can be received on the first rail 1010 between the first fork yoke 2102 and the first cradle yoke 2022. Accordingly, the first arm spring 1016 can bias the first fork yoke 2102 (and thereby the range fork 216) axially along the first rail 1010 in a direction away from the cradle 2000. The second arm spring 1018 can be a compression spring that can be received on the second rail between second cradle yoke 2024 and the fourth fork yoke 2204. Accordingly, the second arm spring 1018 can bias the fourth fork yoke 2204 (and thereby the mode fork 330) axially along the second rail 1012 in a direction away from the cradle 2000.

Figure 13:
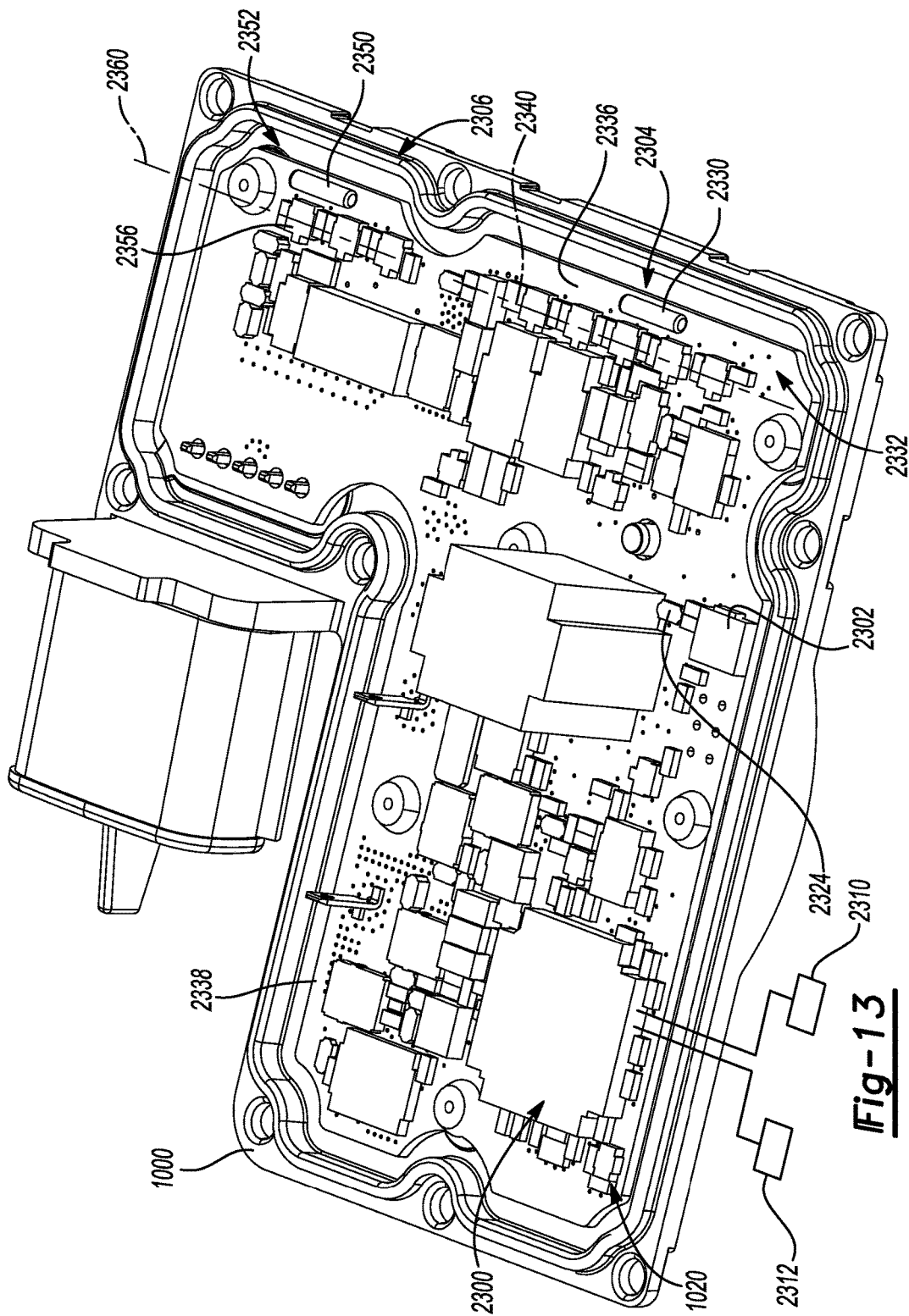
FIG. 13 is a bottom view of a portion of the twin-fork actuator.
Figure 14:
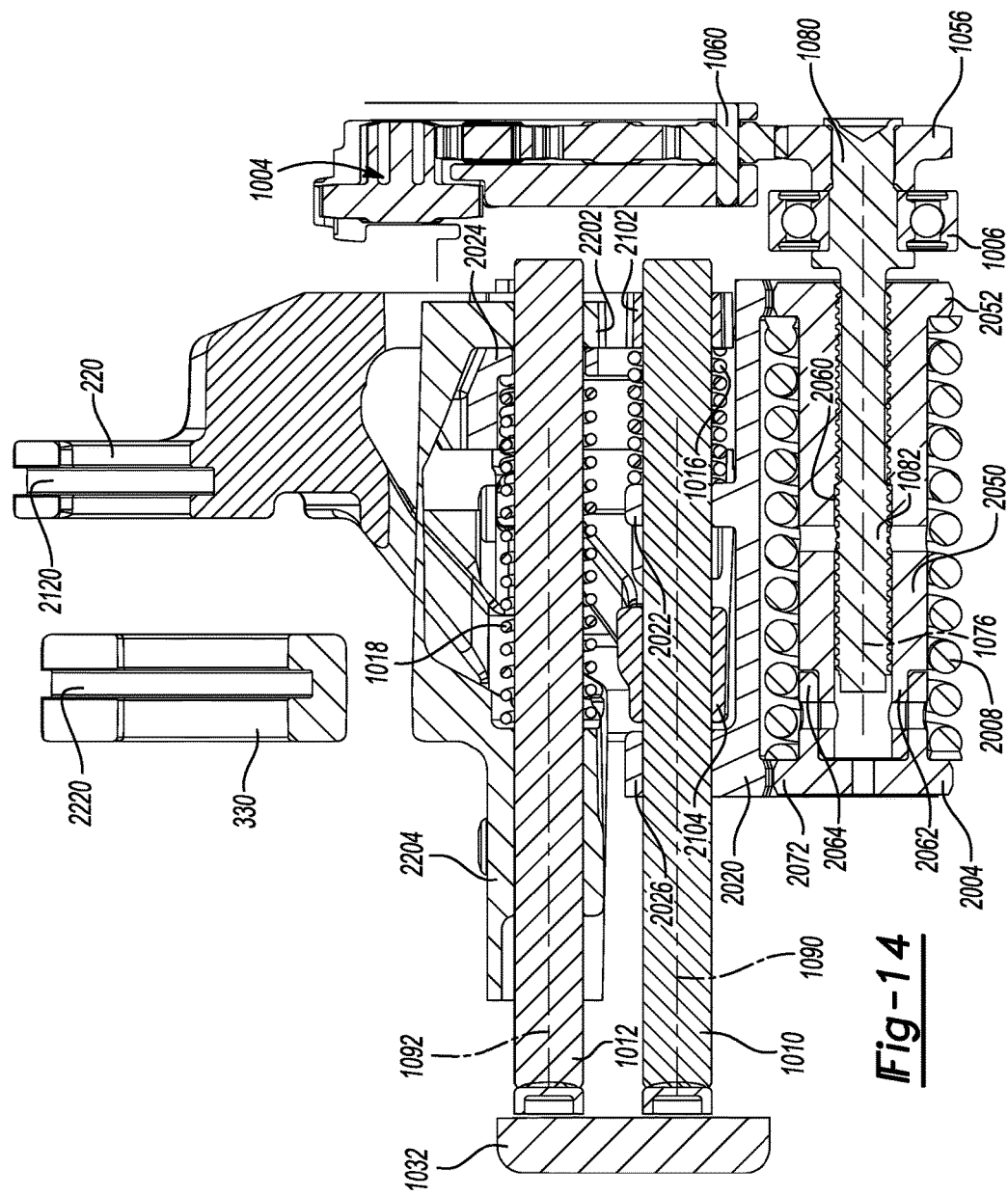
FIG. 14 is a section view through the twin-fork actuator taken through the center of the first and second rails.
Figure 15:
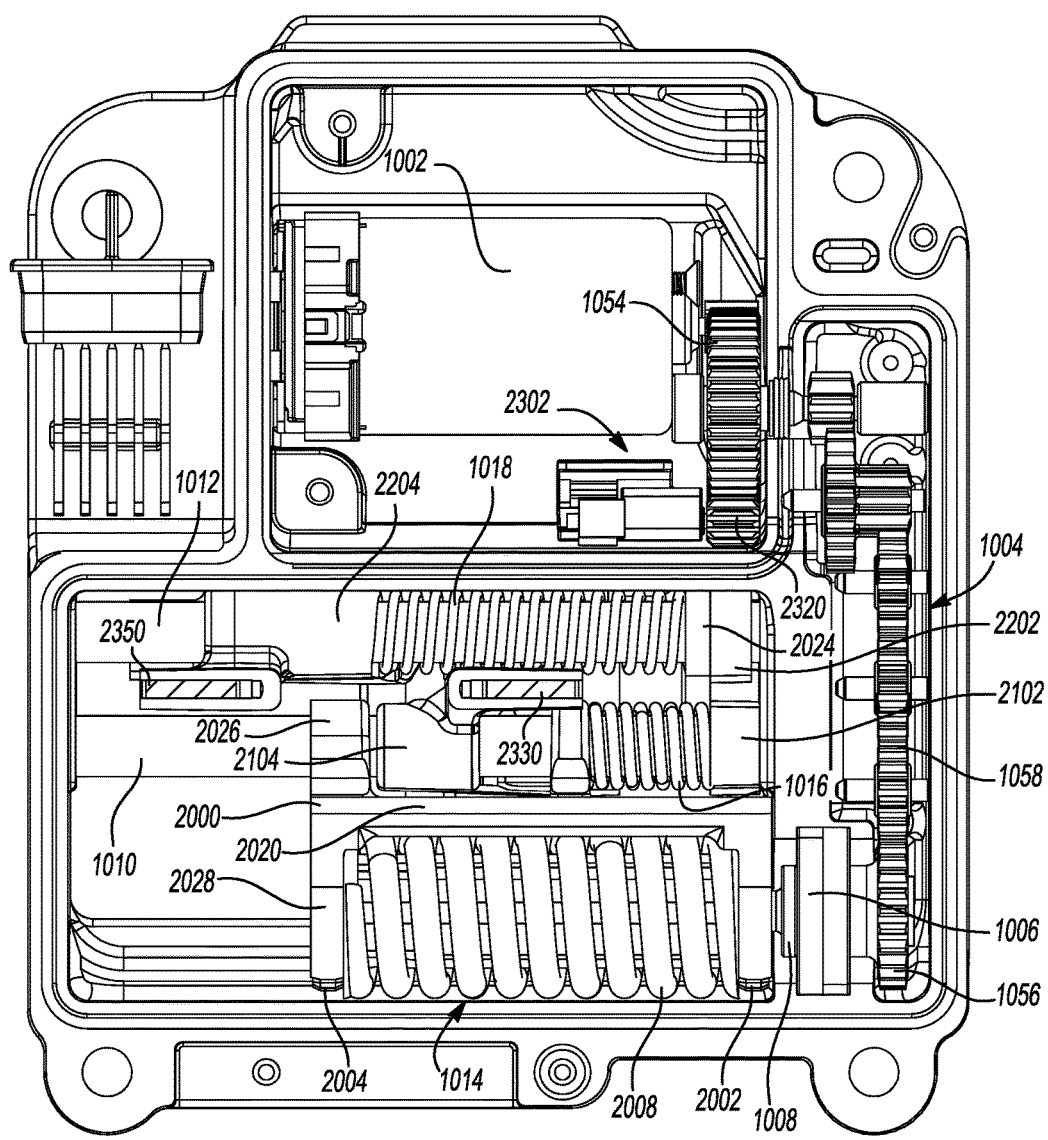
FIG. 15 is a top view of a portion of the twin-fork actuator.
Figure 16:
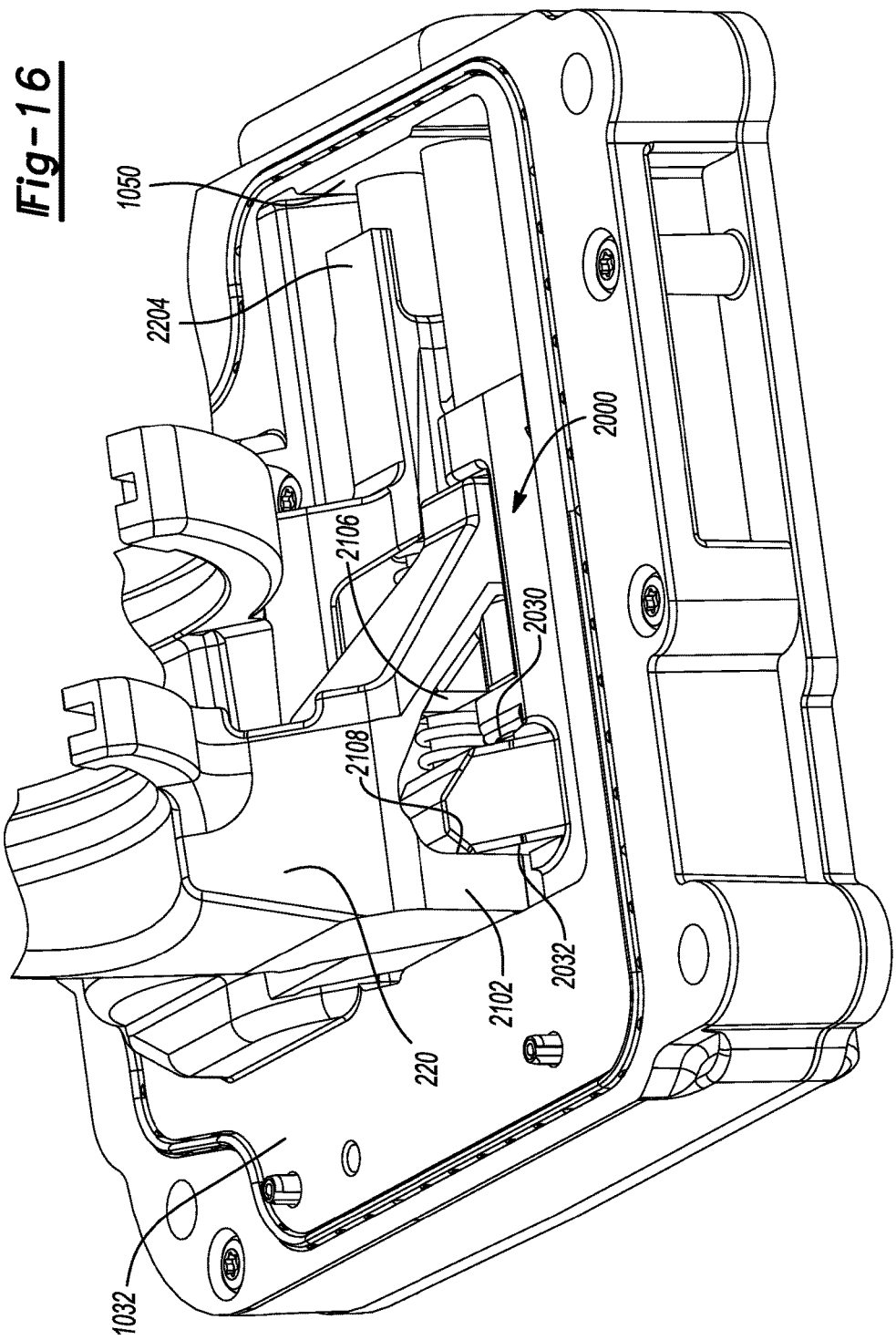
FIG. 16 is a perspective view of a portion of the twin-fork actuator.

With reference to FIGS. 10 and 13, the control system 1020 can comprise a controller 2300, a rotary sensor 2302, a first position sensor 2304 and a second position sensor 2306. The controller 2300 can be coupled to a vehicle controller 2300, a source of electrical power 2312 and the motor 1002. The controller 2300 and the vehicle controller 2300 can communicate with one another to transmit vehicle data, a desired range setting and a desired mode setting from the vehicle controller 2300 to the controller 2300, and to transmit operational data from the controller 2300 to the vehicle controller 2300. The controller 2300 can selectively couple the motor 1002 to the source of electrical power 2312 to control the rotational direction of the motor 1002 and the extent to which the motor 1002 operates.

The rotary sensor 2302 can be coupled to the actuator housing 1000 and can be configured to sense rotation of a component within the actuator A and responsively generate a rotary sensor signal. In the particular example provided, the rotary sensor 2302 comprises a sensor pinion 2320, which is driven by a first one of the intermediate spur gears 1058, a magnetic pulse wheel 2322, which is coupled to the sensor pinion 2320 for rotation therewith, and a Hall-effect sensor 2324 that is configured to sense rotation of the magnetic pulse wheel 2322 and generate a rotary sensor signal in response thereto.

The first position sensor 2304 can comprise a first sensor target 2330 and a first sensor 2332. The first sensor target 2330 can comprise a first magnet that can be fixedly coupled to the range fork 220 for movement therewith along the first rail 1010. In the example provided, the first sensor target 2330 is fixedly mounted to the second fork yoke 2104. The first sensor 2332 can be any type of sensor that can sense a position of the first sensor target 2330 and responsively produce a first position signal. For example, the first sensor 2332 can comprise a plurality of Hall-effect sensors 2336 that are configured to sense the first sensor target 2330 and responsively produce respective position signals.

In the particular example provided, the first sensor 2332 comprises five Hall-effect sensors 2336 that are fixedly coupled to a circuit board 2338 of the controller 2300 and which are disposed along a first sensor axis 2340 that can be generally parallel to the second axis 1090. The five Hall-effect sensors 2336 cooperate with the first sensor target 2330 to permit the movement of the range fork 220 along the second axis 1090 to be monitored and reported so that the controller 2300 can identify at least three predetermined positions of the range fork 220, such as a high-speed position, a neutral speed position, and a low-speed position, and optionally a first intermediate position, in which the range fork 220 is disposed in between the high-speed and neutral speed positions, and a second intermediate position, in which the range fork 220 is disposed in between the neutral speed and low-speed positions.

The second position sensor 2306 can comprise a second sensor target 2350 and a second sensor 2352. The second sensor target 2350 can comprise a second magnet that can be fixedly coupled to the mode fork 330 for movement therewith along the second rail 1012. In the example provided, the second sensor target 2350 is fixedly mounted to the fourth fork yoke 2204. The second sensor 2352 can be any type of sensor that can sense a position of the second sensor target 2350 and responsively produce a second position signal. For example, the second sensor 2352 can comprise a plurality of Hall-effect sensors 2356 that are configured to sense the second sensor target 2350 and responsively produce respective position signals.

In the particular example provided, the second sensor 2352 comprises three Hall-effect sensors 2356 that are fixedly coupled to the circuit board 2338 of the controller 2300 and which are disposed along a second sensor axis 2360 that can be generally parallel to the third axis 1092. The three Hall-effect sensors 2356 cooperate with the second sensor target 2350 to permit the movement of the mode fork 330 along the third axis 1092 to be monitored and reported so that the controller 2300 can identify at least two predetermined positions of the mode fork 330, such as a two-wheel drive position and a four-wheel drive position, and optionally a third intermediate position between the two-wheel and four-wheel drive positions.

In operation, the controller 2300 can operate the motor 1002 to drive the cradle assembly 1014 (via the lead screw 1008) to coordinate movement of the range fork 220 and the mode fork 330. The rotary sensor 2302 can be employed by the controller 2300 to control the amount by which the motor 1002 rotates the lead screw 1008, while the first and second position sensors 2304 and 2306 can be employed by the controller 2300 to identify the positioning of the range collar 180 and the mode collar 320 (or the range fork 220 and the mode fork 330).

When the power transmitting component is operated in the two-wheel drive, high range (FIG. 6), the cradle assembly 1014 can be positioned in a first cradle position along the first axis 1076 such that the first arm spring 1016 is compressed between the first arm yoke—and the first fork yoke 2102 and the range fork 220 is abutted against the edge of the fork window 1050 (i.e., the range fork 220 is in the high-speed position), while the second arm spring 1018 biases the mode fork 330 in a direction such that the third fork arm 2028 abuts the second cradle arm 2028 to thereby position the mode fork 330 in the two-wheel drive position.

If a change in the manner that the power transmitting component operates is desired, the lead screw 1008 can be rotated in a first rotational direction to drive the cradle assembly 1014 along the first axis 1076 in a first axial direction. Assuming that the mode collar 320 moves along the input member axis 92 with movement of the cradle assembly 1014 along the first axis 1076, the mode fork 330 can be moved from the two-wheel drive position, to the third intermediate position and thereafter into the four-wheel drive position. In the event that the mode collar 320 is not able to move into the four-wheel drive position (e.g., the second (internal) set of mode teeth 322 is not aligned to the mode teeth 270 on the PTU input member 32), the second arm spring 1018 can provide sufficient compliance to permit the cradle assembly 1014 to be fully moved by the lead screw 1008 despite the cessation of movement of the mode fork 330, as well as apply a biasing force (directed axially along the second rail 1012) to the fourth fork yoke 2204 that will cause the mode fork 330 to move along the second rail into the four-wheel drive position when the second (internal) set of mode teeth 322 is aligned to and engageable with the mode teeth 270 on the PTU input member 32.

If a further change in the manner that the power transmitting component operates is desired, the lead screw 1008 can be rotated in a first rotational direction to further drive the cradle assembly 1014 along the first axis 1076. Assuming that the range collar 180 moves along the input member axis 92 with movement of the cradle assembly 1014 along the first axis 1076, the range fork 220 can be moved from the high-speed position, to the neutral speed position and thereafter into the low-speed position. In the event that the range collar 180 is not able to move into the low-speed position (e.g., the sixth set of (internal) range teeth 214 is not aligned to the second set of (external) range teeth 192 on the input shaft 170), the cradle spring 2008, through its compression between the head 2052 of the cradle body 2002 and the opposite arm 2028 of the cradle 2000) can provide sufficient compliance to permit the cradle assembly 1014 to be fully moved by the lead screw 1008 despite the cessation of movement of the range fork 220. Moreover, because the first cradle drive lug 2030 contacts the first fork drive lug 2106 as the cradle 2000 drives the range fork 220 into the low-speed position, compression of the cradle spring 2008 applies a biasing force (directed axially along the first axis 1076) to the cradle 2000 that will cause the cradle 2000 to move the range fork 220 into the low-speed position when the sixth set of (internal) range teeth 214 is aligned to and engageable with the second set of (external) range teeth 192 on the input shaft 170.

When the user desires to shift the power transmitting component out of the low-speed, four-wheel drive mode, the lead screw 1008 can be rotated in a second rotational direction (opposite the first rotational direction) to move the cradle assembly 1014 along the first axis 1076 in a second axial direction that is opposite the first axial direction. Assuming that the range collar 180 moves along the input member axis 92 with movement of the cradle assembly 1014 along the first axis 1076, the range fork 220 can be moved from the low-speed position to the neutral speed position and thereafter into the high-speed position.

In the event that the range collar 180 is not able to move into the high-speed position (e.g., the range collar 180 is torque-locked to the input shaft 170), first arm spring 1016 can be compressed to permit the second cradle drive lug 2032 to contact the second fork drive lug 2108. Further rotation of the lead screw 1008 in the second rotational direction can move the cradle body 2002 in the second axial direction relative to the cradle 2000 to cause compression of the cradle spring 2008. The compression of the cradle spring 2008 provides a degree of compliance that permits the cradle body 2002 to be fully moved by the lead screw 1008 without corresponding motion of the cradle 2000 or the range fork 220. Compression of the cradle spring 2008 can maintains a force on the cradle 2000 that is transmitted through the second cradle drive lug 2032 and the second fork drive lug 2108 that tends to urge both the cradle 2000 and the range fork 220 in the second axial direction and away from the mode fork 330. Additionally, the first arm spring 1016 is compressed in this state and applies a biasing force to the range fork 220 to urge the range fork 220 toward the high-speed position.

When the user desires to shift the power transmitting component out of the high-speed, four-wheel drive mode and into the high-speed, two-wheel drive mode, the lead screw 1008 can be further rotated in the second rotational direction to further move the cradle assembly 1014 along the first axis 1076 in the second axial direction. Assuming that the mode collar 3200 moves along the input member axis 92 with movement of the cradle assembly 1014 along the first axis 1076, the mode fork 330 can be moved from the four-wheel drive position to the third intermediate position and thereafter into the two-wheel drive position.

In the event that the mode collar 320 is not able to move into the two-wheel drive position (e.g., the mode collar 320 is torque-locked to the PTU input member 32), the lead screw 1008 can be driven in the second rotational direction to move the cradle body 2002 in the second axial direction relative to the cradle 2000 to cause compression of the second arm spring 1018 and optionally the cradle spring 2008. The compression of the second arm spring 1018 (and optionally the cradle spring 2008) provides a degree of compliance that permits the cradle body 2002 to be fully moved by the lead screw 1008 without corresponding motion of the cradle 2000 or the mode fork 330. Compression of the cradle spring 2008 can maintains a force on the cradle 2000 that is transmitted through the second cradle yoke 2024 to the third fork yoke 2202 that tends to urge both the cradle 2000 and the mode fork 330 in the second axial direction toward the range fork 220.

The controller 2300 can be configured to limit (or coordinate the limitation of) power transmitted through the power transmitting component in the event that the range collar 180 is only engaged to either the input shaft 170 or to the planet carrier 176 to a predetermined extent (i.e., an extent that is less than fully engaged), or if the mode collar 320 is only engaged to the PTU input member 32 to a predetermined extend (i.e., an extent that is less than fully engaged). More specifically, the controller 2300 can be configured to perform the following method: translating the collar (e.g., the range collar 180 or the mode collar 320) to a fully disengaged position (e.g., a neutral position); generating a command to move the clutch fork (e.g., the range fork 220 or the mode fork 330) to an engaged position (e.g., the low-speed position or the high-speed position for the range fork 220 or the four-wheel drive position for the mode fork 330) and responsively operating the electric motor (e.g., motor 1002) to cause the clutch fork to move the collar toward the fully engaged position; determining a position of the collar along the axis (e.g., input member axis 92) after the electric motor has halted operation; and limiting rotary power transmitted through the collar if the collar is not located in the fully engaged but is nevertheless engaged to the second power transmitting member to at least a predetermined extent. Additionally, the method could inhibit transmission of rotary power through the collar if the collar is not in the fully disengaged position and the collar is engaged to the second power transmitting member to an extent that is less than the predetermined extent.

Figure 17:
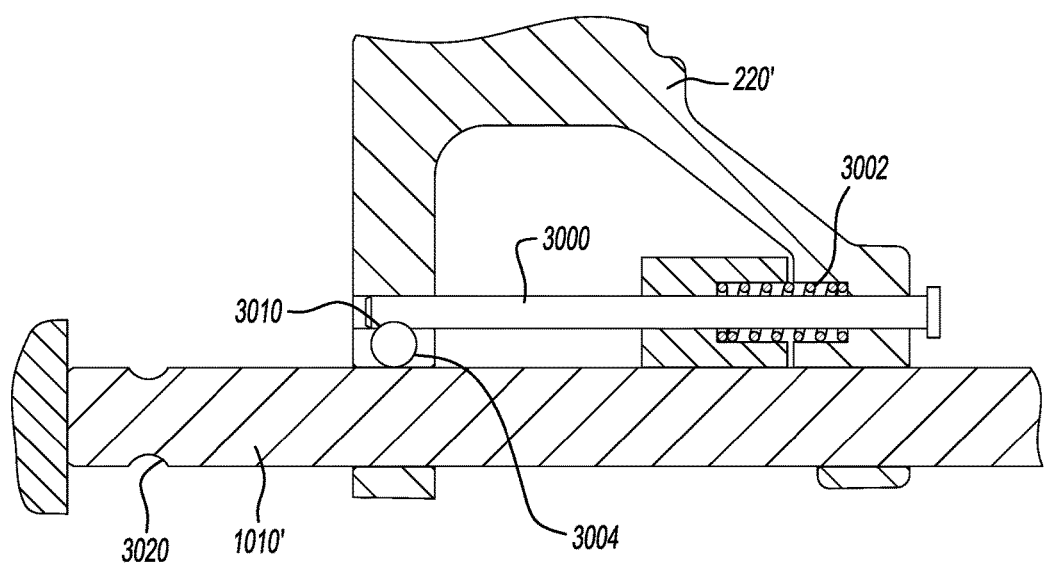
FIG. 17 is a schematic illustration of a portion of another twin-fork actuator having a locking mechanism for locking the range and/or mode forks in corresponding desired positions.

It will be appreciated that one or more locking devices can be integrated into the actuator A to lock the range fork 220 and/or the mode fork 330 in a desired position. In the example of FIG. 17, a detent mechanism D is incorporated into each of the range fork 220' and the mode fork (not specifically shown). The detent mechanism comprises a plunger 3000, a plunger spring 3002, and a detent ball 3004 that is mounted in a detent aperture 3006 formed in the range fork 220'. The plunger 3000 is mounted to the range fork 220' generally parallel to the first rail 1010'. The plunger 3000 includes a first ball groove 3010 that is configured to be complementary to the detent ball 3004. The plunger spring 3002 is mounted coaxially about the plunger 3000 and is configured to bias the plunger 3000 such that the first ball groove 3010 is not in-line with the detent ball 3004. When the range fork 220' is moved into a desired position, the detent aperture 3006 is aligned to a second ball groove 3020 formed in the first rail 1010', which permits the plunger spring 3002 to move the plunger 3000 such that the detent ball 3004 is moved into the second ball groove 3020. In this condition, the detent ball 3004 is not disposed in the first ball groove 3010 and as such, the plunger 3000 prevents the detent ball 3004 from being withdrawn (into the detent aperture 3006 in the range fork 220') by an amount that permits the detent ball 3004 to disengage the first rail 1010'. Accordingly, the range yoke 220' is locked in the desired position. To unlock the range yoke 220', another structure, such as the cradle (not shown), the actuator housing (not shown) or the mode fork (not shown) can be employed to press on the plunger 3000 to move the plunger 3000 relative to the range fork 220' to align the detent ball 3004 to the first ball groove 3010.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
an actuator housing;
a motor coupled to the actuator housing;
a transmission driven by the motor, the transmission being at least partially housed in the actuator housing;
a lead screw that is rotatable about a first axis, the lead screw being driven by the transmission;
a first rail extending along a second axis that is generally parallel to the first axis;
a second rail extending along a third axis that is generally parallel to the first axis;
a cradle assembly driven by the lead screw axially along the first axis, the cradle assembly comprising a cradle, a cradle body and a cradle spring, the cradle having a first cradle yoke that is slidably received on the first rail, the cradle body being received in the cradle and threadably coupled to the lead screw, the cradle spring resiliently coupling the cradle body to the cradle; and
a clutch fork slidably mounted on the second rail;
wherein movement of the cradle along the first rail coordinates movement of the clutch fork along the third axis.

2. The power transmitting component of claim 1, further comprising a sensor target and a sensor, the sensor target being coupled to the clutch fork for movement therewith, the sensor being coupled to the actuator housing and configured to sense the sensor target and responsively produce at least one sensor signal that is indicative of a location of the clutch fork along the third axis.

3. The power transmitting component of claim 2, wherein the sensor comprises a plurality of Hall-effect sensors that are spaced apart along a sensor axis that is parallel to the third axis.

4. The power transmitting component of claim 1, wherein the transmission comprises a gear train, the gear train having an input pinion, which is coupled to an output shaft of the motor for rotation therewith, and an output pinion that is coupled to the lead screw for common rotation.

5. The power transmitting component of claim 1, wherein the clutch fork is pivotably mounted on the second rail.

6. A power transmitting component comprising:
a power take-off unit having a mode clutch, the mode clutch having a mode member that is axially movable along a power transmitting axis between a first mode position, in which no rotary power is transmitted through the mode clutch, and a second mode position in which rotary power is transmitted through the mode clutch; and
an actuator having an actuator housing, a motor coupled to the actuator housing, an actuator transmission, a lead screw, a first rail, a second rail, a cradle assembly, and a clutch fork, the actuator transmission being driven by the motor and being at least partially housed in the actuator housing, the lead screw being driven by the transmission about a first axis, the first rail extending along a second axis that is generally parallel to the first axis, the second rail extending along a third axis that is generally parallel to the first axis, the cradle assembly being driven by the lead screw axially along the first axis, the cradle assembly comprising a cradle having a first cradle yoke, which is slidably received on the first rail, a cradle body and a cradle spring, the cradle body being received in the cradle and threadably coupled to the lead screw, the cradle spring resiliently coupling the cradle body to the cradle, the clutch fork being slidably mounted on the second rail, the clutch fork being engaged to the mode member such that movement of the clutch fork along the third axis causes corresponding movement of the mode member along the power transmitting axis;
wherein movement of the cradle along the first rail coordinates movement of the clutch fork along the third axis.

7. The power transmitting component of claim 6, further comprising a sensor target and a sensor, the sensor target being coupled to the clutch fork for movement therewith, the sensor being coupled to the actuator housing and configured to sense the sensor target and responsively produce at least one sensor signal that is indicative of a location of the clutch fork along the third axis.

8. The power transmitting component of claim 7, wherein the sensor comprises a plurality of Hall-effect sensors that are spaced apart along a sensor axis that is parallel to the third axis.

9. The power transmitting component of claim 6, wherein the transmission comprises a gear train, the gear train having an input pinion, which is coupled to an output shaft of the motor for rotation therewith, and an output pinion that is coupled to the lead screw for common rotation.

10. The power transmitting component of claim 6, wherein the clutch fork is pivotably mounted on the second rail.

* * * * *